United States Patent [19]

Greiner

[11] 4,350,133
[45] Sep. 21, 1982

[54] COLD START CHARACTERISTICS OF ETHANOL AS AN AUTOMOBILE FUEL

[76] Inventor: Leonard Greiner, 2750-C Segerstrom, Santa Ana, Calif. 92704

[21] Appl. No.: 151,191

[22] Filed: May 19, 1980

[51] Int. Cl.³ .............................................. F02M 13/00
[52] U.S. Cl. ...................................... 123/550; 123/3; 48/61
[58] Field of Search ................. 123/1 A, 3, DIG. 12, 123/550, 551; 48/61; 422/197, 198, 208, 240

[56] References Cited

U.S. PATENT DOCUMENTS

| | | | |
|---|---|---|---|
| 1,064,086 | 6/1913 | Porter et al. | 123/550 |
| 1,068,708 | 7/1913 | Southey | 123/550 |
| 1,343,635 | 6/1920 | Manker | 123/550 |
| 1,398,370 | 11/1921 | Eustis | 123/550 |
| 1,425,339 | 8/1922 | Rector | 123/550 |
| 2,206,685 | 7/1940 | Balachowsky | 123/3 |
| 2,415,619 | 2/1947 | Wichmann et al. | 48/61 |
| 2,603,557 | 9/1948 | Roush | 44/56 |
| 2,661,054 | 12/1953 | Hyatt et al. | 123/550 |
| 2,889,819 | 1/1958 | Lockheed | 123/25 |
| 3,682,142 | 5/1971 | Newkirk | 123/3 |
| 3,688,755 | 4/1971 | Grayson | 123/127 |
| 3,717,129 | 9/1970 | Fox | 123/1 |
| 3,783,841 | 10/1971 | Hirschler, Jr. | 123/127 |
| 3,788,283 | 10/1972 | Perry | 123/3 |
| 3,807,377 | 8/1971 | Hirschler, Jr. | 123/127 |
| 3,828,736 | 1/1972 | Koch | 123/3 |
| 3,851,633 | 10/1972 | Shih | 123/127 |
| 3,855,980 | 4/1970 | Weisz et al. | 123/3 |
| 3,892,218 | 11/1973 | Senger | 123/127 |
| 3,906,915 | 3/1973 | Bednarczyk et al. | 123/127 |
| 3,915,125 | 2/1974 | Henkel et al. | 123/3 |
| 3,919,988 | 1/1971 | Bun | 123/119 |
| 3,973,524 | 11/1974 | Rubin | 123/3 |
| 3,985,108 | 7/1974 | Matsumoto et al. | 123/3 |
| 3,986,350 | 2/1975 | Schmidt | 60/274 |
| 4,002,150 | 3/1975 | Shinohara et al. | 123/3 |
| 4,003,343 | 4/1975 | Lee | 123/3 |
| 4,008,692 | 11/1974 | Shinohara et al. | 123/3 |
| 4,011,840 | 4/1975 | Forster | 123/3 |
| 4,018,190 | 5/1975 | Henault | 123/3 |
| 4,019,477 | 7/1975 | Overton | 123/127 |
| 4,024,912 | 5/1977 | Hamrick et al. | 48/61 |
| 4,030,453 | 10/1975 | Sugimoto | 123/3 |
| 4,033,133 | 3/1976 | Houseman et al. | 60/606 |
| 4,036,180 | 3/1976 | Noguchi et al. | 123/3 |
| 4,037,568 | 4/1975 | Schreiber | 123/3 |
| 4,046,522 | 6/1976 | Chen et al. | 48/102 |
| 4,054,423 | 7/1975 | Blenman | 48/2 |
| 4,056,087 | 3/1976 | Boyce | 123/127 |
| 4,070,993 | 1/1977 | Chen | 123/3 |
| 4,086,877 | 1/1976 | Henkel et al. | 123/1 |
| 4,108,114 | 5/1976 | Kosaka et al. | 123/3 |
| 4,112,876 | 9/1976 | Mentschel | 123/3 |
| 4,122,802 | 9/1976 | Noguchi et al. | 123/3 |
| 4,143,620 | 9/1976 | Noguchi et al. | 123/3 |
| 4,147,142 | 3/1976 | Little | 123/133 |
| 4,150,954 | 11/1977 | Abthoff et al. | 48/102 |
| 4,170,200 | 10/1977 | Takeuchi et al. | 123/3 |
| 4,174,954 | 2/1978 | Kusebauch et al. | 48/212 |

Primary Examiner—P. S. Lall
Attorney, Agent, or Firm—Knobbe, Martens, Olson, Hubbard & Bear

[57] ABSTRACT

An alcohol fuel burner and decomposer in which one stream of fuel is preheated by passing it through an electrically heated conduit to vaporize the fuel, the fuel vapor is mixed with air, the air-fuel mixture is ignited and combusted, and the combustion gases are passed in heat exchange relationship with a conduit carrying a stream of fuel to decompose the fuel forming a fuel stream containing hydrogen gas for starting internal combustion engines, the mass flow of the combustion gas being increased as it flows in heat exchange relationship with the fuel carrying conduit, is disclosed.

23 Claims, 2 Drawing Figures

COLD START CHARACTERISTICS OF ETHANOL AS AN AUTOMOBILE FUEL

The Government has rights in this invention pursuant to Contract No. DE-AC03-78CS51737 between the University of Santa Clara and the U.S. Department of Energy.

TECHNICAL FIELD

This invention relates to methods for starting internal combustion engines and particularly to methods and apparatus for decomposing alcohol base fuels to form a hydrogen gas containing starter fuel stream for internal combustion engines.

Alcohol, methanol and ethanol in particular, have long been considered as potential fuel sources for internal combustion engines. Alcohol based fuels are very attractive from both the energy conservation and ecological points of view because they can be produced from self-renewing energy sources and also because the burning of such fuels creates less pollution in the air than results from the burning of hydrocarbon fuels.

Notwithstanding the attractive features of alcohol as an internal combustion engine fuel, the greatest application being, of course, in the operation of automobiles, such fuels have attained only very limited success and application. There are a number of practical and economic considerations which must be overcome before alcohol can be considered a major replacement for hydrocarbon fuels. One of the most important practical imitations on the use of alcohol as a motor fuel is that it is virtually impossible to start an internal combustion engine directly on alcohol at even moderately low temperatures. At any temperature below about 40° F., it becomes difficult to start an alcohol fueled engine and at temperatures in the 20° F. to −20° F., and lower, temperature ranges, it is impractical and, at lower temperatures, impossible to start an alcohol fueled internal combustion using alcohol as the direct fuel source. Once the engine has started, and is producing an exhaust heat, it is quite feasible to preheat the alcohol, by heat exchange with the exhaust, for example, or with a coolant liquid, before it enters into the carburation system of the engine. The problem, thus, is one of initially starting and warming the engine to the point that the engine produces sufficient heat to prewarm the alcohol fuel. Once the engine is running, then the starter system may be deactuated until another start cycle is required.

This problem is starting alcohol fueled internal combustion engines has been recognized in the art and there have been numerous attempts to solve the problem. Among the attempts to solve the problem are efforts to decompose alcohol to form a hydrogen containing starter fuel. These starter fuels typically would contain hydrogen and carbon monoxide. Ideally, the starter fuel would be substantially pure hydrogen-carbon monoxide mixture; however, depending upon the degree and nature of decomposition, other decomposition fragments may be included in the starter fuel. The prior art efforts to use this general approach to starting internal combustion engines have not been satisfactory.

A major problem which heretofore has not been solved is that it usually requires a relatively long preheat cycle to warm the alcohol up or to bring it to a decomposition temperature. If it requires more than a few seconds to start the engine, the system will not be accepted by the public at large as satisfactory for starting automobile engines. The public has become accustomed to virtually instant starting of hydrocarbon fueled internal combustion engines and anything less than instantaneous starting cannot be considered to be an economically viable approach to the solution of this problem.

In addition, the decomposition of alcohol, particularly of methyl alcohol, has resulted in the formation of large quantities of carbon deposits in the form of soot. The soot tends to coat all surfaces with which it comes into contact including, of course, the surfaces of any decomposition containment structures. It is usually necessary to transfer heat through a heat exchange wall into the fuel for decomposition. If the wall becomes coated with a heavy layer of soot, heat exchange is very greatly diminished and the efficiency of the decomposition process tails off very badly with time. In addition to the loss of efficiency and sometimes of total effectiveness in the decomposition, soot tends to clog conduits, valves, connections between conduits, and the like and, in general, is an intolerable product of alcohol decomposition.

The prior art devices for starting automobiles generally fall within one or more of the following categories, or combinations of these. The first is an electrical heater, which operates off from the automobile battery, and simply warms the ethanol as it approaches the carburetor, vaporizing the ethanol, or methanol so that the starting occurs with alcohol vapor. The second approach is to mix some starting material with the alcohol. This may be a hydrocarbon which provides a quick start but also spoils the pure alcohol burning characteristics and contributes to pollution. Highly volatile, highly combustible material such as ethyl ether may also be used but this adds a whole new dimension to the problem in terms of the hazard involved in storing explosive materials. The third approach is to use a secondary fuel, sometimes a gallon of gasoline is carried for example, which is used to start the automobile. After the engine is started, the engine is converted over to burning the alcohol.

The prior art is replete with various approaches to using alternate or substitute fuels and decomposing all or part of various types of fuel, either alone or in mixtures with other fuels for other materials. An alcohol-water fuel is disclosed by Roush U.S. Pat. No. 2,603,557; a fuel mixing device is disclosed in U.S. Pat. No. 2,889,819, Lockheed; hydrocarbon and hydrocarbon-water fuels are decomposed to form a hydrogen containing fuel, Newkirk, U.S. Pat. No. 3,682,142; hydrocarbon fuel is separated into more volatile and less volatile components for selective feeding into the engine at various phases of operation, Grayson, U.S. Pat. No. 3,688,755; exhaust gas heat is used to reform fuel, Fox, U.S. Pat. No. 3,717,129; separate fuels of differing volatilities are utilized in starting and in operating an engine, Hirschler, Jr., et al, U.S. Pat. No. 3,783,841, Perry, U.S. Pat. No. 3,788,283, Hutchinson, U.S. Pat. No. 3,799,125 and Hirschler, Jr., et al, U.S. Pat. No. 3,807,377; hydrocarbon fuels are converted to methane-carbon monoxide fuels, Koch, U.S. Pat. No. 3,828,736; light ends of the fuel are used for starting, Shih, U.S. Pat. No. 3,851,633; octane rating of fuel is increased by catalytic preconversion before burning, Weisz, et al, U.S. Pat. No. 3,855,980; gasoline is partially fractionated to provide a selective starting fuel from one fraction of the gasoline, Senger, U.S. Pat. No. 3,892,218 and Bednarczyk et al, U.S. Pat. No. 3,906,915; catalytic gas reformation of fuel, Henkel et al, U.S. Pat. No. 3,915,125, induction of air or steam, Bun, U.S. Pat. No. 3,919,998; pre-cracking of fuel, Rubin, U.S. Pat. No. 3,973,524; prefractionation of fuel, Matsumoto, et al, U.S. Pat. No. 3,985,108; cracking methanol for utilizing the cracked methanol to operate an internal combustion engine, hydrogen gas and carbon monoxide from the cracked methanol serving as the primary fuel source, Schmidt, U.S. Pat. No. 3,986,350, Oct. 19, 1976, entitled Method of and Apparatus for Improved Methanol Operation of Combustion Systems; steam reformation of hydrocarbons and methanol, as basic fuels, Shinohara, U.S. Pat. No. 4,002,150, Jan. 11, 1977, gas generator for mounting on an automobile; exhaust heated fuel reformer for water-hydrocarbon mixtures, Lee, U.S. Pat. No. 4,003,343, and also for alcohols as well as hydrocarbons, Shinohara, U.S. Pat. No. 4,008,692, Feb. 22, 1977, Vehicle-Mounted Gaseous Fuel Generator; pre-cracking of fossil fuels, Forster, U.S. Pat. No. 4,011,840, generation of hydrogen from a methyl hydride for starting engines, Henault, U.S. Pat. No. 4,018,190; the use of an auxiliary carburetor for mixing air and alcohol for operation of an engine during certain cycles, Overton, U.S. Pat. No. 4,019,477, preheating of fuel mixtures, Sugimoto, U.S. Pat. No. 4,030,453; the use of the electrical system of the automobile for preheating, and the catalytic conversion of air and fuel mixtures into hydrogen rich product gases, Houseman, et al, U.S. Pat. No. 4,033,133, July 5, 1977, Start Up System for Hydrogen Generator Used with an Internal Combustion Engine; fuel reforming to provide a hydrogen containing fuel mixture, Noguchi, U.S. Pat. No. 4,036,180, July 19, 1977, Fuel Reforming System for an Internal Combustion Engine; generation of hydrogen by exhaust heat as a fuel stream, Schreiber, U.S. Pat. No. 4,037,568; pre-engine converters to convert liquid fuel and to gaseous fuel, U.S. Pat. No. 4,046,522; the generation of an acetylene gas as a fuel, Blenman, U.S. Pat. No. 4,054,423; the selective use of gasoline and an alcohol in a single carburetor for operation of an internal combustion engine, Boyce, U.S. Pat. No. 4,056,087; particular pre-engine converters for increasing the octane of fuels, Chen, U.S. Pat. No. 4,070,993, Henkel, U.S. Pat. No. 4,086,877, Kosaka, U.S. Pat. No. 4,108,114, Mentschel, U.S. Pat. No. 4,112,876, Noguchi et al, U.S. Pat. No. 4,122,802 and U.S. Pat. No. 4,143,620; cracking and vaporizing of fuel, utilizing exhaust gases, Little, et al, U.S. Pat. No. 4,147,142; the generation of gaseous from liquid fuels, Abthoff, et al, U.S. Pat. No. 4,150,954; internal combustion engines in which alcohol and air undergo thermal or catalytic reforming to produce hydrogen containing gaseous fuel streams with minimization of the production of soot and tar, Takeuchi, et al, U.S. Pat. No. 4,170,200, Oct. 9, 1979, Internal Combustion Engine with Reformed Gas Generator, and specific methods of catalytic preconversion of fuels, Kusebauch, et al, U.S. Pat. No. 4,174,954, have all been described in the prior art. The present invention provides a simple, direct and straightforward solution to the problem of starting internal combustion engines using an alcohol base fuel and differs from the prior art in the conceptual approach taken, and the method steps involved and in the apparatus utilized.

DISCLOSURE OF THE INVENTION

The present invention, as embodied in apparatus, comprises an alcohol fuel burner and decomposer which comprises means for preheating a stream of fuel, mixing the preheated fuel stream with air, or any other oxidizing gas mixture, means for igniting the resulting air-fuel mixture and containing the mixture during combustion thereof. The combustion gases are received by a heat exchange confining means through an entrance way of relatively larger size, as compared with the exit, directing the combustion gases through a progressively smaller flow area to an exit which is of relatively smaller size, as compared with the entrance. The heat exchange confining means having therein heat exchange conduit means through which fuel flows in heat exchange relationship with the combustion gas for heating the fuel in the conduit to decompose the fuel forming hydrogen gas containing starter fuel stream for use in the automobile or other internal combustion engine, the heat exchange confining means and heat exchange conduit means being so constructed and configured that the mass flow of combustion gas increases from the entrance to the exit and the heat exchange rate between the combustion gas and the fuel in the conduit remains generally constant from the entrance to the exit.

Particular features of the apparatus include preheating means for the fuel which is burned comprising a length of conduit which carries the fuel and which is electrically heated to a temperature substantially above the vaporization temperature of the fuel, thereby vaporizing the fuel before it is mixed with the air, or other oxidizing gas mixture, for combustion; particular configurations and compositions of heat exchanger means including heat exchanger means which comprise a copper portion and a high temperature resistant ferrous alloy portion, and heat exchanger means composed of high nickel chromium containing alloy, for prevention of soot and tar formation.

The method of the invention comprises the steps of burning one stream of fuel and passing combustion gases from that fuel stream into heat exchange relationship with a conduit carrying another stream of fuel, increasing the mass flow of the combustion gas as it flows in said heat exchange relationship to increase the relative mass conduct of the combustion gas with the conduit as the combustion gas moves progressively over the conduit to maintain the rate of heat exchange between the combustion gas and the fuel in the conduit at a generally constant rate, to decompose the fuel thereby forming a hydrogen gas containing starter fuel for the automobile or other internal combustion engine. Again, particular alloys and combinations of heat exchanger materials are utilized along with electrical preheating of the fuel which is burned to provide the decomposition heat.

Figure 1:
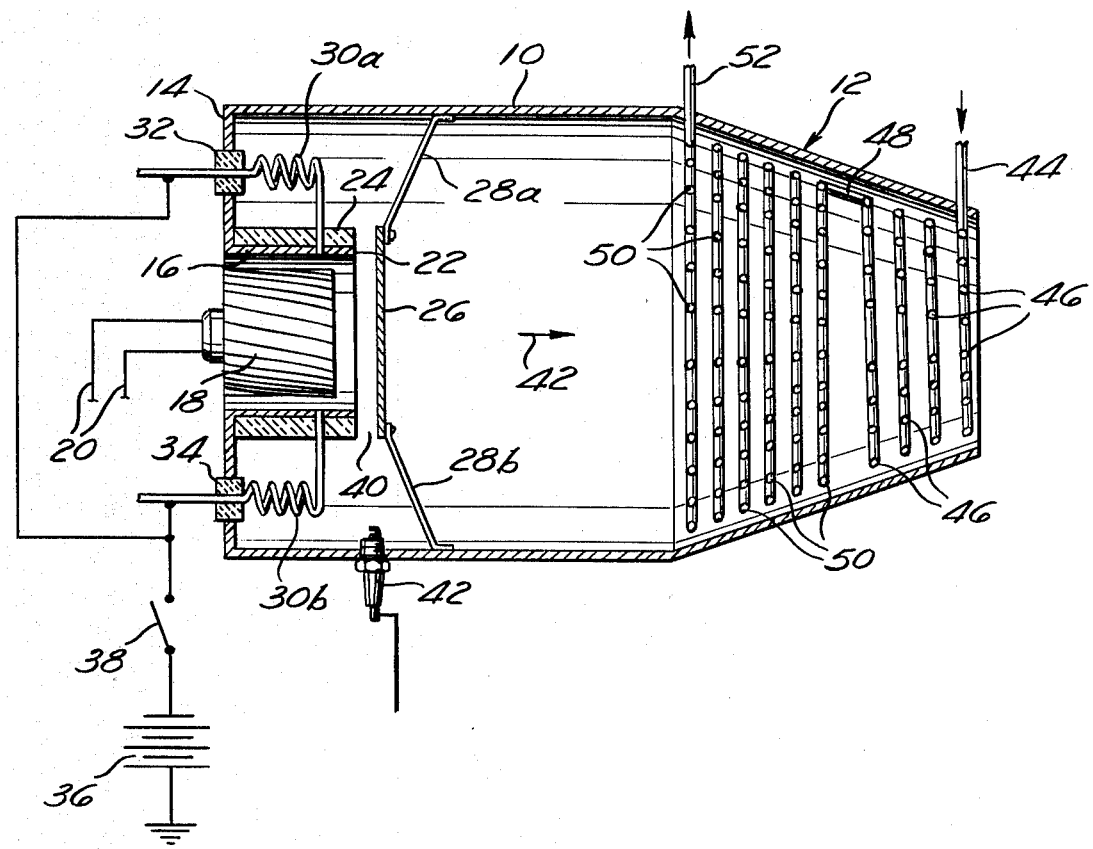
FIG. 1 is a side view, in partial cross-section, schematically depicting the alcohol fuel burner and decomposer of this invention.

The alcohol fuel burner and decomposer of FIG. 1 comprises a combustion container 10, in the preferred embodiment, connected to a frustoconical heat exchange confining means 12. At the front end of the combustion container 10, there is an opening 16 into which a fan or blower 18 is inserted. The fan is run by an electrical source, such as a battery, through electrical connectors 20, in the conventional manner. As the fan rotates, it forces air through an interior cylinder formed by opening 16 and walls 22, which may include an insulating layer 24, or may simply be of sufficient thickness to give sufficient thermostability to insulate the fan, considering that the fan is self-cooled by the air blowing past it. A disc like baffle 26 extends across the opening 5 to disperse the gas outwardly. The baffle may be supported by any desired means such as support rods indicated at 28a and 28b.

A pair of coils 30a and 30b, formed of a high electrical resistant conductor, such as Nichrome, stainless steel, or other high temperature resistant material having a substantially higher electrical resistance than copper, extend through insulators 32 and 34 respectively into an annulus portion between walls 22 and the outer wall of the combustion container 10, the ends of the tubes 30a and 30b being electrically connected to the walls 16, which are generally at ground potential.

The tubes 30a and 30b are connected through a switch of any desired type, shown at 38, to a source of electricity, indicated as the automobile battery 36. There may, of course, be any number of coiled tubes. When switch 38 is closed, the coil or coils 30a and 30b are essentially shunted or shorted across the battery or other electrical source which by electrical resistance causes these coils to heat extremely rapidly, within a second or two usually, to a very high temperature, substantially above the temperature at which alcohol will vaporize.

The fuels utilized are termed as alcohol based fuels connoting that the fuels contain as a substantial major constituent, usually above 70%, alcohol. Methyl alcohol is preferred, and methyl and ethyl alcohol are the most commonly used fuels, although other higher alcohols may be mixed with or substituted for one or both of these more commonly available alcohols.

The alcohol flows through the tubes 30a and 30b where it is vaporized and is injected as a vapor into the passage way 16 where the fan 18 is carrying air inwardly, from right to left in the figure as shown and mixes the air with the vaporized alcohol to form an air-alcohol fuel mixture. The term air as used here means any oxidizing gas mixture and may include pure oxygen, or other oxygen containing gas. Typically, of course, air would be used or air enriched with oxygen. For purposes of the present invention, all of these gases are considered the same as or equivalent to air.

The air-fuel mixture is ignited by any convenient means, a spark plug 42 being indicated as exemplary. Glow plugs and other ignitors may, of course, be used. The fuel, when ignited moves into the combustion chamber 42 where combustion is essentially completed.

The combustion gases, which may include some uncombusted materials in which case combustion continues, move into the heat exchange chamber 12 which, in the preferred embodiment, is in a frustoconical configuration.

In one preferred embodiment of the invention, a heat exchange conduit is formed of copper tubing 46 connected by any intermediate connection, such as a weldment, or tubular connector of any desired type 48, to a thermally resistant ferrous alloy tube 50. Stainless steel tubing of several grades are quite suitable for use as the heat exchange tubing 50. Alcohol enters at 44, flows through tube 46, the connector 48 and the tube 50 and then exits at 52 where alcohol decomposition products hydrogen and carbon monoxide are available for and suitable for use as a starting fuel for an internal combustion engine.

Figure 2:
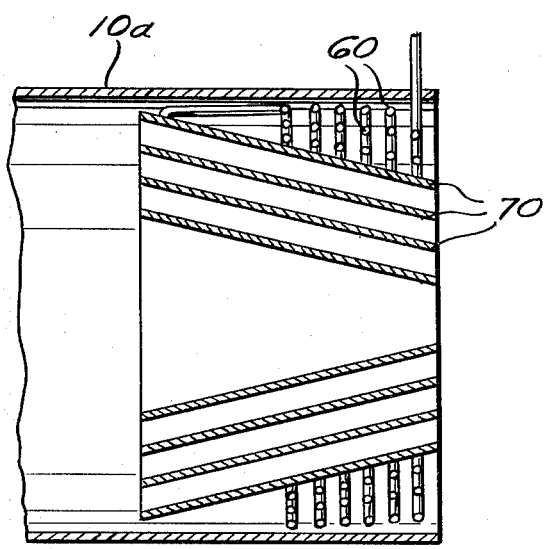
FIG. 2 is a side view, in cross-section, depicting a portion of an alternative embodiment of the alcohol fuel burner and decomposer of this invention.

In an alternative embodiment, as depicted in FIG. 2, the combustion container 10 may extend in a cylindrical or continuous form without diminishing to a smaller opening. In this embodiment, a conduit 60, preferably a copper tubing which is wound in a generally cylindrical outward configuration, so as to fit inside the walls 10a, and a generally frustoconical inner configuration so as to fit adjacent a second conductor indicated at 70. The conductor 70 is an elongate serpentine conductor formed in a generally frustoconical configuration fitted inside the walls 10a, one turn of which forms the generally frustoconical heat exchange confining means on the outside and the remainder of the turns being generally frustoconical in configuration and wound in a progressive spiral configuration, either inwardly or outwardly as may be desired. In this embodiment of the invention, the coil 60 is preferably of copper tubing and the generally concentric annular frustoconical conduit portions 70 are formed of a high temperature resistant ferrous alloy such as one of the stainless steels. Alternatively, of course, the entire heat exchanger may be made of a high nickel chromium containing alloy.

In one embodiment of the invention, it has been found very advantageous to form the heat exchange conduit means of two separate conduit portions, the first being of copper and the second being of a high temperature ferrous alloy. The basis for this is the discovery that alcohol can be heated to its decomposition temperature in copper without partial decomposition of the alcohol to form hydrogen, carbon monoxide and intermediate products, the most notable and troublesome of which are soots and tars. Thus, the exit from the copper conduit portion of the heat exchanger is at a temperature sufficient to cause decomposition of the alcohol, in a ferrous alloy, but without any such partial decomposition.

When the hot alcohol enters the ferrous alloy portion of the heat exchanger, it instantaneously and in a one-step process, decomposes totally to hydrogen and carbon monoxide without the formation of intermediate decomposition products such as soot, tars and the like which form if the alcohol gradually is heated to the decomposition temperature. In practice, one cannot normally use copper at the maximum desired temperature because it lacks sufficient heat resistance. It is necessary, to bring about instantaneous decomposition, to have an extremely high heat input into the alcohol and this requires a high temperature differential across the heat exchange wall. These high temperatures cannot be tolerated by copper.

In an alternative and also preferred embodiment, the entire heat exchanger, or at least a significant portion thereof, is formed of a high nickel chromium alloy. It has been discovered that if the alloy contains a high percentage of nickel, at least about 60% nickel, and preferably around 75% nickel, with a chromium content of, generally, at least about 10%, and preferably around 15%, with the balance being substantially iron, one step decomposition to hydrogen and carbon monoxide without the formation of soot and tars occurs without preheating of the alcohol. A preferred alloy of this type is Inconel 600, which is 76% nickel, 15.8% chromium and 7.2% iron. The composition of the alloy is not of extreme importance so long as it is in this general range.

Particular attention is focused upon the means for preheating the fuel which is burned. By conducting the fuel through a conduit which is electrically resistive and, when formed as part of an electrical circuit, becomes, and effects, an electrical resistance heater, and applying a sufficient current to this conduit-electrical resistance heater, the alcohol is virtually instantaneously vaporized, within a second or less in most instances and never more than a few seconds, so that the burner ignites virtually instantaneously to provide instantaneous heat to the heat exchanger which heats within a matter of two or three seconds to a temperature sufficient to begin decomposition of the alcohol. Within just a few seconds, a stream of hydrogen and carbon monoxide is available for introduction into the engine as a starting fuel.

In operation, as the hot vaporized alcohol flows through the hot heat exchange conduit, which is heated to a red hot temperature, approximately 700° to 800° C., the heat input to the alcohol is sufficient to decompose the alcohol quantitatively without intermediate equilibrium steps, so that the exit gas is substantially pure carbon monoxide and hydrogen.

The design of the heat exchange confining means, which is constructed and disposed to receive combustion gases from the combustion containing means in an entrance which is relatively larger than the exit, directing the combustion gas through a progressively smaller flow area than the exit, which is of relatively smaller size compared with the entrance, is an extremely important concept, construction and method. As the gas flows through the heat exchanger which, in a preferred embodiment, is frustoconical in configuration, its temperature is reduced by absorption. The mass flow rate of the gas, however, is increased because of the diminishing size of the flow path. Thus, the heat exchange rate between the combustion gas and the alcohol to be decomposed remains generally constant through the length of the heat exchange confining means. Other configurations can be utilized to obtain a heat confining means in which the flow area of the gas is progressively diminished, thereby progressively increasing the mass flow of the gas. A frustoconical configuration is simply one such configuration which is highly advantageous in construction.

Considerable energy is required to cause decomposition of the alcohol. For example, it takes one-fifth the energy of combustion to decompose methanol. Thus, the carbon monoxide-hydrogen output of the gaseous fuel is higher in energy content than the methanol. The high energy, gaseous fuel mixture is an excellent starting gas for internal combustion engines. The hazard usually associated with storage of highly volatile liquids or gaseous starting fuels is completely avoided according to the principles of this invention.

The burner and decomposer of this invention is extremely compact. Indeed, one of the design criteria is that the entire apparatus as depicted in the drawings, except for the battery and the wiring, and the external conduits to the fuel storage means and the internal combustion engine, is conveniently made to approximately the size of a one gallon gasoline can.

Another advantage of the present invention is that it gives a very fast start, usually one or two seconds. This is a result not accomplished in the prior art efforts generally, and if accomplished, has been accomplished only at great cost in terms of complexity and expense.

In addition, the present invention is extremely efficient in terms of fuel consumption. There is virtually no wastage of fuel, since the fuel which is burned is utilized in large part to increase the energy content of the starting hydrogen-carbon monoxide fuel mixture. In addition, the start cycle of burning lasts only a few seconds.

Another important advantage of this invention is that it is ecologically very desirable. There are no aldehydes, carbon particles or soots, tars or other undesirable combustion products. Only carbon dioxide and water are omitted into the air. These are, of course, ecologically safe and compatible.

Yet another important feature of this invention is that it operates at a very high space velocity insofar as the gas flow is concerned. The space velocity in most catalytic converters is about 2,500 whereas the space velocity and the burner and decomposer of this invention is about 50,000, giving a compactness factor of approximately 1/20 the volume which would necessarily be occupied by a catalytic converter to achieve the same conversion of alcohol to hydrogen and carbon monoxide.

INDUSTRIAL APPLICATION

This invention finds a large scale industrial application in automotive internal combustion engines and in internal combustion engines generally, where operation on alcohols is desired.

What is claimed is:

1. An alcohol fuel burner and decomposer comprising:
   means for preheating at least one stream of fuel;
   means for mixing said preheated fuel with air;
   means for igniting the resulting air-fuel mixture;
   combustion chamber means for containing the ignited air-fuel mixture during combustion thereof;
   heat exchange confining means constructed and disposed to receive combustion products from the combustion chamber means in an entrance of a relatively larger size, directing the combustion products through a progressively smaller flow area to an exit of relatively smaller size, as compared with the entrance, and
   heat exchange conduit means in the heat exchange confining means for conducting a stream of fuel in heat exchange contact with the combustion products for heating said fuel in said conduit means to the decomposition temperature of the fuel for forming a hydrogen gas containing starter fuel stream,
   the heat exchange confining means and heat exchange conduit means being so constructed and configured that the mass flow rate of combustion products increases from entrance to exit and the heat exchange rate between the combustion products and the fuel in the heat exchange conduit means remains generally constant from entrance to exit.

2. The burner and decomposer of claim 1 wherein the means for preheating the fuel stream comprises a length of conduit for carrying said fuel stream to the mixing means, and electrical circuit means for completing an electrical path to a source of electricity through said length of conduit for virtually instantaneously heating said conduit to a temperature substantially above the vaporization temperature of the fuel for vaporizing the fuel before the fuel enters the mixing means.

3. The burner and decomposer of claim 2 wherein the electrical circuit means includes an automobile battery.

4. The burner and decomposer of claim 3 wherein the heat exchange confining means and the heat exchange conduit means are both formed in a generally frustoconical configuration, the heat exchange conduit means comprising elongate conduit means curved and formed overall to correspond generally to the internal configuration of the heat exchange confining means.

5. The burner and decomposer of claim 4 wherein the heat exchange means comprises an elongate tubular conduit wound in serpentine configuration to form an overall frustoconical configuration.

6. The burner and decomposer of claim 4 wherein the heat exchange means comprises a plurality of generally concentric annular conduit sections each of which is in a generally frustoconical configuration.

7. The burner and decomposer of claim 4 wherein the heat exchange means comprises a first section composed of copper and a second section composed of a high temperature resistant ferrous alloy, the first section being disposed to be contacted by lower temperature combustion products the second section being disposed to be contacted by higher temperature combustion products proximate the entrance of the heat exchange confining means.

8. The burner and decomposer of claim 4 wherein the heat exchange means is composed of high nickel ferrous alloy containing at least about 60 percent nickel and at least about 10 percent chromium.

9. The burner and decomposer of claim 8 wherein the alloy contains about 75 percent nickel and about 15 percent chromium.

10. The burner and decomposer of claim 1 wherein the heat exchange confining means and the heat exchange conduit means are both formed in a generally frustoconical configuration, the heat exchange conduit means comprising elongate conduit means curved and formed overall to correspond generally to the internal configuration of the heat exchange confining means.

11. The burner and decomposer of claim 10 wherein the heat exchange means comprises an elongate tubular conduit wound in serpentine configuration to form an overall frustoconical configuration.

12. The burner and decomposer of claim 10 wherein the heat exchange means comprises a plurality of generally concentric annular conduit sections each of which is in a generally frustoconical configuration.

13. The burner and decomposer of claim 1 wherein the heat exchange means comprises a first section composed of copper and a second section composed of a high temperature resistant ferrous alloy, the first section being disposed to be contacted by lower temperature combustion products the second section being disposed to be contacted by higher temperature combustion products proximate the entrance of the heat exchange confining means.

14. The burner and decomposer of claim 1 wherein the heat exchange means is composed of high nickel ferrous alloy containing at least about 60 percent nickel and at least about 10 percent chromium.

15. The burner and decomposer of claim 14 wherein the alloy contains about 75 percent nickel and about 15 percent chromium.

16. An alcohol fuel burner and decomposer, comprising:
means for preheating at least one stream of fuel;
means for combusting the preheated fuel;
combustion chamber means for containing the preheated fuel during combustion thereof;
heat exchange confining means having an entrance for receiving the high-temperature combustion products from said combustion chamber means and an exit for emitting lower-temperature combustion products; and
heat exchange conduit means in said heat exchange confining means for conducting a stream of alcohol in heat exchanging contact with the combustion products, said heat exchange conduit means comprising,
a first section adjacent the exit of said heat exchange confining means, said first section being in heat exchanging contact with the lower-temperature combustion products, said first section including means for preventing partial decomposition as the alcohol is heated to the decomposition temperature thereof, and
a second section adjacent the entrance of said heat exchange confining means in heat exchanging contact with the higher-temperature combustion products, said second section including means for heating alcohol to a temperature higher than the decomposition temperature thereof wherein alcohol at the decomposition temperature passing from said first section into said second section is rapidly decomposed to form hydrogen and carbon monoxide without the formation of intermediate products by partial decomposition.

17. An alcohol fuel burner and decomposer, comprising:
means for providing high-temperature combustion products;
heat exchange confining means having an entrance for receiving the high-temperature combustion products and an exit for emitting lower-temperature combustion products;
heat exchange conduit means in said heat exchange confining means for conducting a stream of alcohol in heat exchanging contact with the combustion products, said heat exchange conduit means comprising,
a first section adjacent the exit of said heat exchange confining means, said first section being in heat exchanging contact with the lower-temperature combustion products, said first section including means for preventing partial decomposition as the alcohol is heated to the decomposition temperature thereof, and
a second section adjacent the entrance of said heat exchange confining means in heat exchanging contact with the higher-temperature combustion products, said second section including means for heating alcohol to a temperature higher than the decomposition temperature thereof wherein alcohol at the decomposition temperature passing from said first section into said second section is rapidly decomposed to form hydrogen and carbon monoxide without the formation of intermediate products by partial decomposition.

18. An alcohol fuel burner and decomposer according to claims 16 and 17 wherein said first section of said heat exchange conduit means comprises copper tubing and wherein said second section comprises high-temperature-resistant ferrous alloy tubing connected to said first section for receiving alcohol therefrom.

19. An alcohol fuel burner and decomposer according to claim 18 wherein said heat exchange confining means is formed in a generally frusto-conical configuration with the entrance having a larger diameter than the exit, whereby the mass flow rate of the combustion gas increases as the combustion gas passes from the entrance toward the exit to maintain a generally constant heat exchange rate between the combustion gas and the alcohol contained within said heat exchange conduit means along the length of said heat exchange conduit means.

20. An alcohol fuel burner and decomposer according to claims 16 and 17 wherein said heat exchange confining means is formed in a generally frusto-conical configuration with the entrance having a larger diameter than the exit, whereby the mass flow rate of the combustion gas increases as the combustion gas passes from the entrance toward the exit to maintain a generally constant heat exchange rate between the combustion gas and the alcohol contained within said heat exchange conduit means along the length of said heat exchange conduit means.

21. An alcohol fuel burner and decomposer according to claim 20 wherein said first and second sections of said heat exchange conduit means comprise a high-nickel ferrous alloy containing at least about sixty percent nickel and at least about ten percent chromium.

22. An alcohol fuel burner and decomposer according to claim 21 wherein the high-nickel ferrous alloy contains about seventy-five percent nickel and about fifteen percent chromium.

23. An alcohol fuel burner and decomposer according to claim 16 or 17 wherein said first and second sections of said heat exchange conduit means comprise a high-nickel ferrous alloy containing at least about sixty percent nickel and at least about ten percent chromium.

* * * * *